US009840329B2

(12) United States Patent
Godecker et al.

(10) Patent No.: US 9,840,329 B2
(45) Date of Patent: *Dec. 12, 2017

(54) INTEGRATED AIRCRAFT GALLEY SYSTEM

(71) Applicant: B/E Aerospace, Inc., Wellington, FL (US)

(72) Inventors: William J. Godecker, Irvine, CA (US); Grant J. West, San Clemente, CA (US); Ralph B. Thayer, San Juan Capistrano, CA (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,051

(22) Filed: May 4, 2016

(65) Prior Publication Data

US 2016/0244168 A1    Aug. 25, 2016

Related U.S. Application Data

(63) Continuation of application No. 14/701,365, filed on Apr. 30, 2015, now Pat. No. 9,340,290, which is a continuation of application No. 14/207,106, filed on Mar. 12, 2014, now Pat. No. 9,038,945.

(60) Provisional application No. 61/798,674, filed on Mar. 15, 2013.

(51) Int. Cl.
*B64D 11/00* (2006.01)
*B64D 11/04* (2006.01)
*B64D 13/08* (2006.01)

(52) U.S. Cl.
CPC .......... *B64D 11/04* (2013.01); *B64D 11/0007* (2013.01); *B64D 13/08* (2013.01); *B64D 2221/00* (2013.01)

(58) Field of Classification Search
CPC .... B64D 11/0007; B64D 11/04; B64D 13/08; B64D 2221/00; B64D 11/00; B64D 11/0403; B64D 45/0015; B64D 11/0691; B62B 2202/67; Y02T 50/46; Y02T 50/56
See application file for complete search history.

(56) References Cited

U.S. PATENT DOCUMENTS 2,763,900 A * 9/1956 McAfee ................ B64C 1/1407
16/360
2,854,307 A * 9/1958 Londeree ............... A47B 77/04
312/247
3,472,219 A * 10/1969 Roy ........................ A47B 51/00
126/37 R

(Continued)

*Primary Examiner* — Medhat Badawi
(74) *Attorney, Agent, or Firm* — Donna P. Suchy (57) ABSTRACT

An integrated aircraft galley structure includes a service module having a plurality of galley inserts including at least one oven and at least one refrigeration unit. The service module is formed with a plurality of bays sized to receive the plurality of galley inserts, along with a human machine interface for controlling all of the galley inserts. The service module further includes a plurality of galley insert modules for controlling each galley insert, and an insert power and control unit for each galley insert for controlling power to said insert. The entire system is controlled by a galley power and control unit for controlling each of the insert galley power and control units, and an AC distribution unit for distributing power to the insert power and control units.

15 Claims, 6 Drawing Sheets

(56) References Cited

U.S. PATENT DOCUMENTS

| | | | | |
|---|---|---|---|---|
| 3,795,771 A * | 3/1974 | Gundersen | ............ | B64D 11/00 340/4.37 |
| 4,022,404 A * | 5/1977 | Greiss | .................. | B64D 11/04 186/40 |
| 4,055,317 A * | 10/1977 | Greiss | .................. | B64D 11/00 244/118.5 |
| 4,361,014 A * | 11/1982 | Blain | ................. | A47J 39/006 62/237 |
| 4,375,876 A * | 3/1983 | Stewart | ................. | B64C 1/1438 160/201 |
| RE32,176 E * | 6/1986 | Vernon | .................. | A47B 77/02 186/40 |
| 4,776,903 A * | 10/1988 | Nordskog | ............. | B64D 11/04 156/153 |
| 5,090,639 A * | 2/1992 | Miller | .................... | B64D 9/00 244/118.1 |
| 5,224,297 A * | 7/1993 | Watkins | ................. | E05B 17/04 292/210 |
| 5,322,244 A * | 6/1994 | Dallmann | ............. | B64D 11/04 244/118.1 |
| 5,907,127 A * | 5/1999 | Daoud | .................... | H02G 3/14 174/57 |
| 5,936,318 A * | 8/1999 | Weiler | ..................... | H02J 4/00 307/18 |
| 6,007,025 A * | 12/1999 | Coughren | ............. | B64D 11/02 105/329.1 |
| 6,257,523 B1 * | 7/2001 | Olliges | ................ | B61D 17/048 160/210 |
| 6,318,672 B1 * | 11/2001 | Traylor | ................. | B64D 11/00 244/118.5 |
| 6,470,512 B1 * | 10/2002 | Lau | .......................... | A47K 3/30 4/612 |
| 6,691,952 B2 * | 2/2004 | Keogh | ..................... | A61G 3/00 244/118.5 |
| 6,761,332 B1 * | 7/2004 | Bengtsson | ............. | B64D 11/04 244/117 R |
| 6,928,236 B2 * | 8/2005 | Suzuki | .................. | B64D 11/04 392/441 |
| 7,098,555 B2 * | 8/2006 | Glahn | ..................... | H02J 3/14 307/31 |
| D610,554 S * | 2/2010 | Lanfear | ........................ | D13/162 |
| 7,954,761 B2 * | 6/2011 | Johnson | ................. | A47B 31/02 244/118.5 |
| 8,387,916 B2 * | 3/2013 | Baatz | ................. | B64D 11/0007 244/118.1 |
| 8,519,824 B1 * | 8/2013 | Rankin | .................. | B64D 11/00 244/118.5 |
| 8,820,862 B1 * | 9/2014 | Erickson | ............ | B64D 11/0691 312/257.1 |
| 9,399,516 B2 * | 7/2016 | Hawkins | ................ | F25D 23/02 |
| 2001/0050519 A1 * | 12/2001 | Kasuya | ................ | B64D 11/04 312/315 |
| 2005/0070152 A1 * | 3/2005 | Suzuki | .................. | H01R 13/641 439/501 |
| 2005/0116098 A1 * | 6/2005 | Martens | ................ | B64C 1/1469 244/118.5 |
| 2005/0121978 A1 * | 6/2005 | McAvoy | ................ | H02J 3/14 307/43 |
| 2005/0133308 A1 * | 6/2005 | Reysa | ..................... | B64D 11/04 186/40 |
| 2005/0224646 A1 * | 10/2005 | Mills | ...................... | B64D 11/04 244/118.5 |
| 2005/0230540 A1 * | 10/2005 | Harrington | ............ | B64D 11/04 244/118.2 |
| 2006/0060181 A1 * | 3/2006 | Sasaki | ................... | F24C 15/322 126/21 A |
| 2006/0145002 A1 * | 7/2006 | Van Loon | ............... | A47B 51/00 244/118.1 |
| 2006/0186268 A1 * | 8/2006 | Harrington | ........ | B64D 11/0007 244/118.5 |
| 2006/0237182 A1 * | 10/2006 | Godecker | ............... | A47J 39/02 165/253 |
| 2007/0102579 A1 * | 5/2007 | Krieglsteiner | ......... | B64D 11/00 244/129.1 |
| 2007/0170310 A1 * | 7/2007 | Bock | ...................... | B64D 11/00 244/118.5 |
| 2007/0228216 A1 * | 10/2007 | Wenstrom | ............... | B64D 11/04 244/118.5 |
| 2008/0001031 A1 * | 1/2008 | Doebertin | ............... | B64D 11/04 244/118.1 |
| 2008/0150406 A1 * | 6/2008 | Arnold | ................... | B64D 11/04 312/237 |
| 2009/0103221 A1 * | 4/2009 | Aronson | ................... | H02J 3/14 361/93.2 |
| 2009/0112377 A1 * | 4/2009 | Schalla | ............... | B64D 11/0015 701/3 |
| 2009/0146005 A1 * | 6/2009 | Bettell | ................... | B64D 11/00 244/118.6 |
| 2009/0206200 A1 * | 8/2009 | Bolder | ................... | B64D 25/16 244/118.5 |
| 2009/0278429 A1 * | 11/2009 | Erickson | ............ | B64D 11/0015 312/265.1 |
| 2009/0314889 A1 * | 12/2009 | Baatz | ................. | B64D 11/0007 244/118.5 |
| 2009/0321574 A1 * | 12/2009 | Erickson | ............ | B64D 11/0023 244/131 |
| 2010/0001126 A1 * | 1/2010 | Supan | ................. | B64D 11/0696 244/1 A |
| 2010/0050665 A1 * | 3/2010 | Oswald | .................. | F25D 11/003 62/89 |
| 2010/0071384 A1 * | 3/2010 | Lu | ...................... | B60H 1/00592 62/3.2 |
| 2010/0116933 A1 * | 5/2010 | Erickson | .................... | B64C 1/20 244/118.5 |
| 2010/0140398 A1 * | 6/2010 | Cunningham | ........ | A47J 31/005 244/118.5 |
| 2010/0155391 A1 * | 6/2010 | Koschberg | .............. | F24C 15/16 219/672 |
| 2010/0219292 A1 * | 9/2010 | Saint-Jalmes | ...... | B64D 11/0023 244/118.5 |
| 2010/0243800 A1 * | 9/2010 | Koschberg | ............. | B64D 11/04 244/118.5 |
| 2011/0090064 A1 * | 4/2011 | Dahms | ................... | B64D 11/04 340/10.42 |
| 2011/0101160 A1 * | 5/2011 | Gomes | .................. | B64C 1/1423 244/118.5 |
| 2011/0148664 A1 * | 6/2011 | Shiomori | ........... | B64D 11/0015 340/945 |
| 2011/0210203 A1 * | 9/2011 | Chua | .................... | B61D 37/006 244/118.5 |
| 2011/0210204 A1 * | 9/2011 | Collins | .................. | B64D 11/06 244/118.6 |
| 2011/0215199 A1 * | 9/2011 | Lee | ......................... | B61D 37/00 244/118.5 |
| 2011/0238742 A1 * | 9/2011 | Birkmann | ............... | G08C 17/02 709/203 |
| 2012/0047911 A1 * | 3/2012 | Bhavsar | ................ | F25B 21/02 62/3.6 |
| 2012/0160111 A1 * | 6/2012 | Hozumi | ................ | F24C 15/327 99/474 |
| 2012/0217343 A1 * | 8/2012 | Koschberg | ............. | B64D 11/04 244/118.5 |
| 2012/0248245 A1 * | 10/2012 | Schliwa | .................. | B61D 35/00 244/118.5 |
| 2012/0261509 A1 * | 10/2012 | Grant | ..................... | B64D 11/02 244/118.5 |
| 2012/0273614 A1 * | 11/2012 | Ehlers | ..................... | B64D 11/02 244/118.5 |
| 2012/0298798 A1 * | 11/2012 | Henshaw | .................. | B64D 11/06 244/118.6 |
| 2012/0318918 A1 * | 12/2012 | Johnson | .................. | B64D 11/06 244/118.6 |
| 2013/0187000 A1 * | 7/2013 | Godecker | ............... | B64D 11/04 244/118.5 |
| 2013/0206904 A1 * | 8/2013 | Gee | ........................ | B64D 11/02 244/118.5 |
| 2013/0206906 A1 * | 8/2013 | Burrows | ............ | B64D 11/0691 244/118.5 |

(56) References Cited

U.S. PATENT DOCUMENTS

| | | | | |
|---|---|---|---|---|
| 2013/0247590 A1* | 9/2013 | Lu | ............................ | F25B 21/02 62/3.6 |
| 2013/0248649 A1* | 9/2013 | Burd | ...................... | B64D 11/04 244/1 N |
| 2013/0248652 A1* | 9/2013 | Godecker | .............. | B64D 11/04 244/118.5 |
| 2013/0248655 A1* | 9/2013 | Kroll | ...................... | B64D 11/06 244/118.6 |
| 2013/0257067 A1* | 10/2013 | Burd | .................. | B64D 11/0007 292/200 |
| 2013/0259562 A1* | 10/2013 | Burd | ...................... | B64D 11/04 403/187 |
| 2013/0270983 A1* | 10/2013 | Godecker | .............. | B64D 11/04 312/236 |
| 2014/0048650 A1* | 2/2014 | Schliwa | ................. | B64D 11/00 244/118.5 |
| 2014/0054416 A1* | 2/2014 | Lee | ........................ | B64D 47/00 244/118.1 |
| 2014/0209741 A1* | 7/2014 | Boenning | .............. | B64D 11/06 244/118.6 |
| 2014/0238064 A1* | 8/2014 | Hawkins | ................. | F25D 23/02 62/244 |
| 2014/0263835 A1* | 9/2014 | Godecker | .............. | B64D 11/04 244/118.5 |
| 2014/0339363 A1* | 11/2014 | Moje | ...................... | B64D 11/00 244/118.5 |
| 2014/0352929 A1* | 12/2014 | Wu | ........................ | A47B 31/06 165/104.34 |
| 2014/0353425 A1* | 12/2014 | Boren, Jr. | .............. | B64D 11/04 244/118.5 |
| 2014/0355282 A1* | 12/2014 | Cuddy | .................. | B64C 1/1407 362/471 |
| 2014/0359934 A1* | 12/2014 | Schliwa | ................. | B64D 11/02 4/664 |
| 2014/0367516 A1* | 12/2014 | Lange | ................... | B65D 88/14 244/118.1 |
| 2014/0367517 A1* | 12/2014 | Eckel | .................... | B64D 47/02 244/118.5 |
| 2015/0028670 A1* | 1/2015 | Boodaghians | ......... | B64D 11/04 307/9.1 |

* cited by examiner

INTEGRATED AIRCRAFT GALLEY SYSTEM

CROSS-REFERENCES TO RELATED APPLICATIONS

This application is a continuation based on U.S. Ser. No. 14/701,365, filed on Apr. 30, 2015, which is a continuation of U.S. Ser. No. 14/207,106, filed on Mar. 12, 2014, U.S. Pat. No. 9,038,945, issue date May 26, 2015, which claims priority from U.S. Provisional Application No. 61/798,674, filed Mar. 15, 2013, the content of which are incorporated herein by reference in their entirety.

BACKGROUND

The "galley" of a commercial aircraft refers to the structure that is used by the flight attendants to prepare food and beverages for the passengers. Due to constraints with space and weight, these structures are very ordered and efficient in all aspects of their construction and arrangement. One important consideration in the design of the galley is arrangement of the various equipment, or "inserts," that make up the galley. Inserts can be any power consumer such as a coffee brewer, an oven, a trash compactor, refrigerator, or any other electrical appliance that can be found in the galley area. Traditionally, the galley of the aircraft is configured to meet the requirements of the aircraft, and then the inserts are incorporated into the galley as space and power availability permit. This can lead to inefficient use of space and weight as the inserts are placed in the galley, often with less than satisfactory results. Moreover, inserts placed in the galley after the galley has been installed in the plane often lead to challenging installations and modifications to the galley.

SUMMARY OF THE INVENTION

The present invention is a new concept for an aircraft galley whereby the components, or inserts, for the galley as well as insert locations are fully integrated with the structure or frame to operate as a single, efficient system. That is, the various components are designed into the galley architecture prior to installation of the galley into the aircraft. This leads to a galley that is more intelligently arranged and lighter than traditional galleys, with greater space efficiency due to the elimination of redundant walls, structure, and air gaps found in conventional galleys. Moreover, the present invention leads to simplified command and control over the various components, and results in better configurability and modularity. In addition, operations such as power distribution can be more effectively controlled by the use of the present invention.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
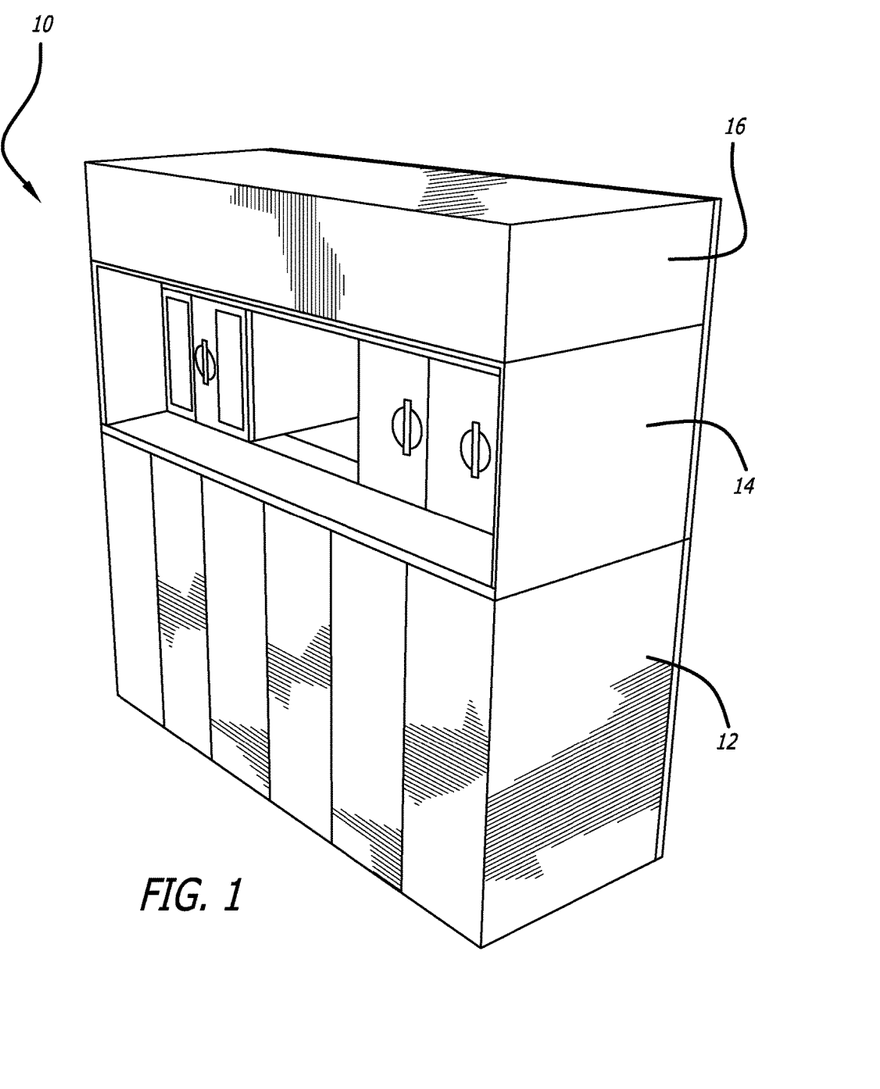
FIG. 1 is an elevated, perspective view of a galley of the present invention.
Figure 2:
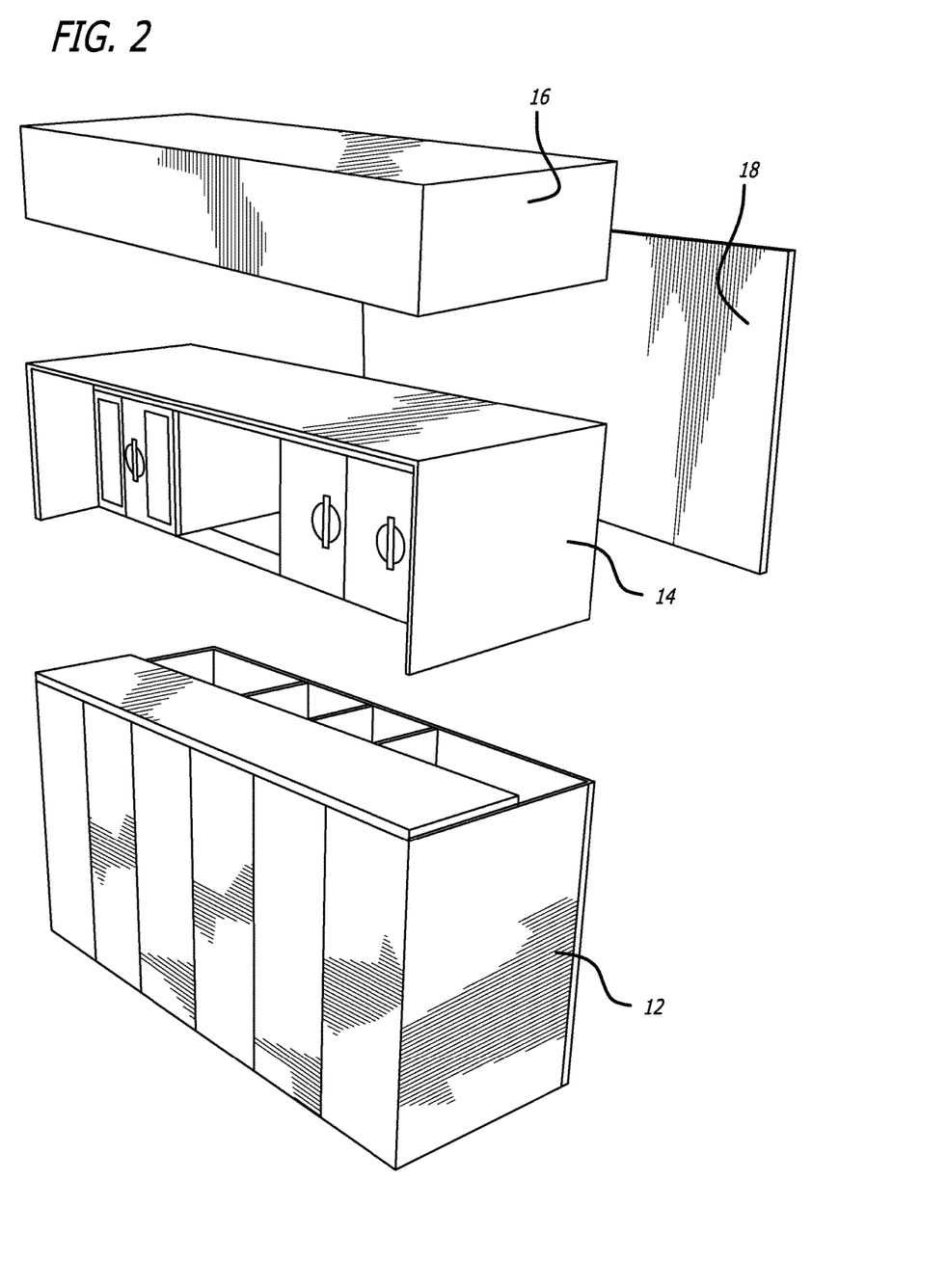
FIG. 2 is an elevated, exploded view of the galley of FIG. 1 with a galley cooling system.

FIG. 1 illustrates an aircraft galley 10 that incorporates the concepts of the present invention. The galley 10 depicted in the illustration has three main divisions: the bottom portion is a storage area 12 that includes storage for, among other things, serving carts that are used by flight attendants to service the passengers; the middle portion is the food and beverage service module 14 where many of the appliances are housed, such as ovens, refrigerators, coffee makers, overhead lighting, and the like; and the top portion is additional storage cabinets 16 for the galley, as well as equipment responsible for power and microprocessor control over the various galley inserts, or "GAINs." As shown in FIG. 2, the galley 10 may also include a fourth component, namely a cooling panel and system 18 that may include vents and heat shields to prevent heat from impacting surrounding equipment adjacent the service module. The service module 14 of traditional galleys is typically where individual appliances of the galley are stored, albeit as stand-alone devices. Here, as will be explained below, the various inserts in the galley 10 of the present invention are designed so as to be incorporated directly into the service module 14 for optimum efficiency.

Figure 3A:
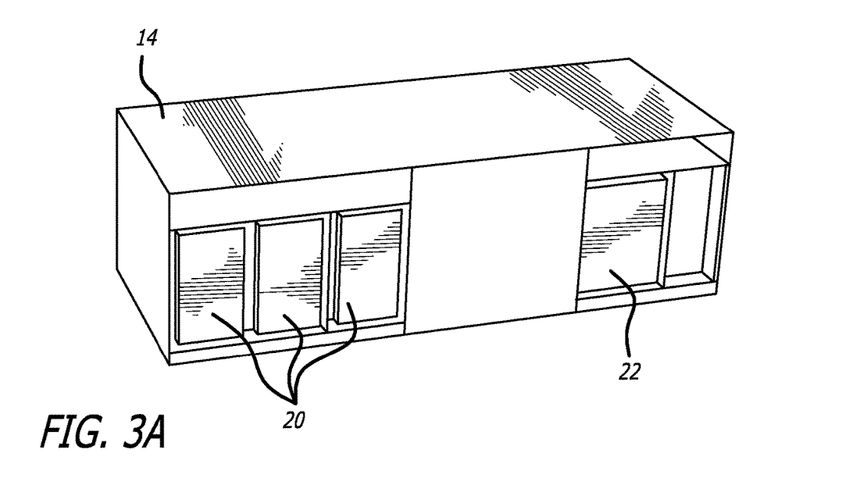
FIG. 3*a* is an elevated, perspective rear view of the oven and refrigerator modules of the service module.
Figure 3B:
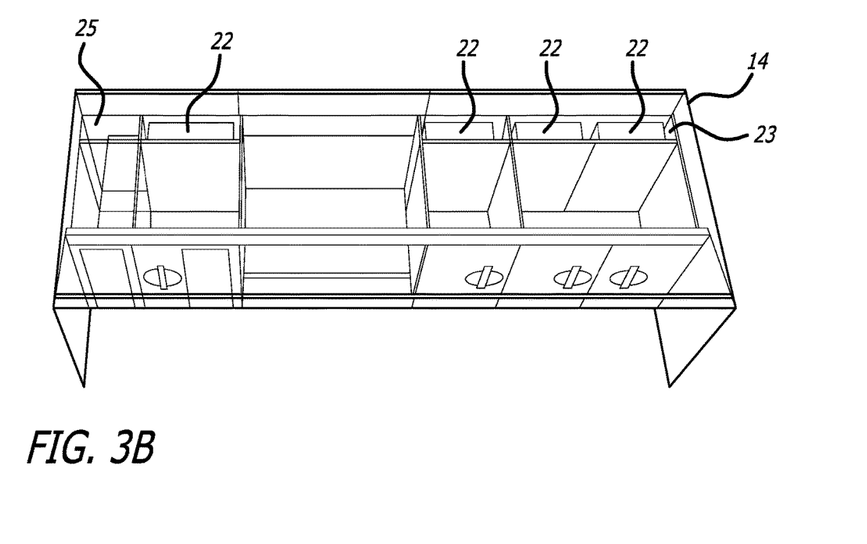
FIG. 3*b* is an overhead view, partially in phantom, of the service module showing the slots for the insert modules.

FIGS. 3*a* and 3*b* illustrate a rear view of the service module 14 where a new modular concept in galley architecture is demonstrated. The service module 14 includes three oven modules 20, as well as a refrigerator module 22, that are formed as part of the service module frame. These oven modules 20 can either be insertable into designated slots 23, 25 formed directly into the frame of the service module 14, or alternatively the modules can be permanently incorporated into the service module frame at the rear of the bay. Thermal insulation, air seals, inner liners, and drip trays can also be designed into the service module 14 rather than trying to create space for these elements after assembly. Similarly, the refrigerator module 22 can include heat exchange components with venting or other needs designed into the service module frame to optimize the available space.

Figure 4:
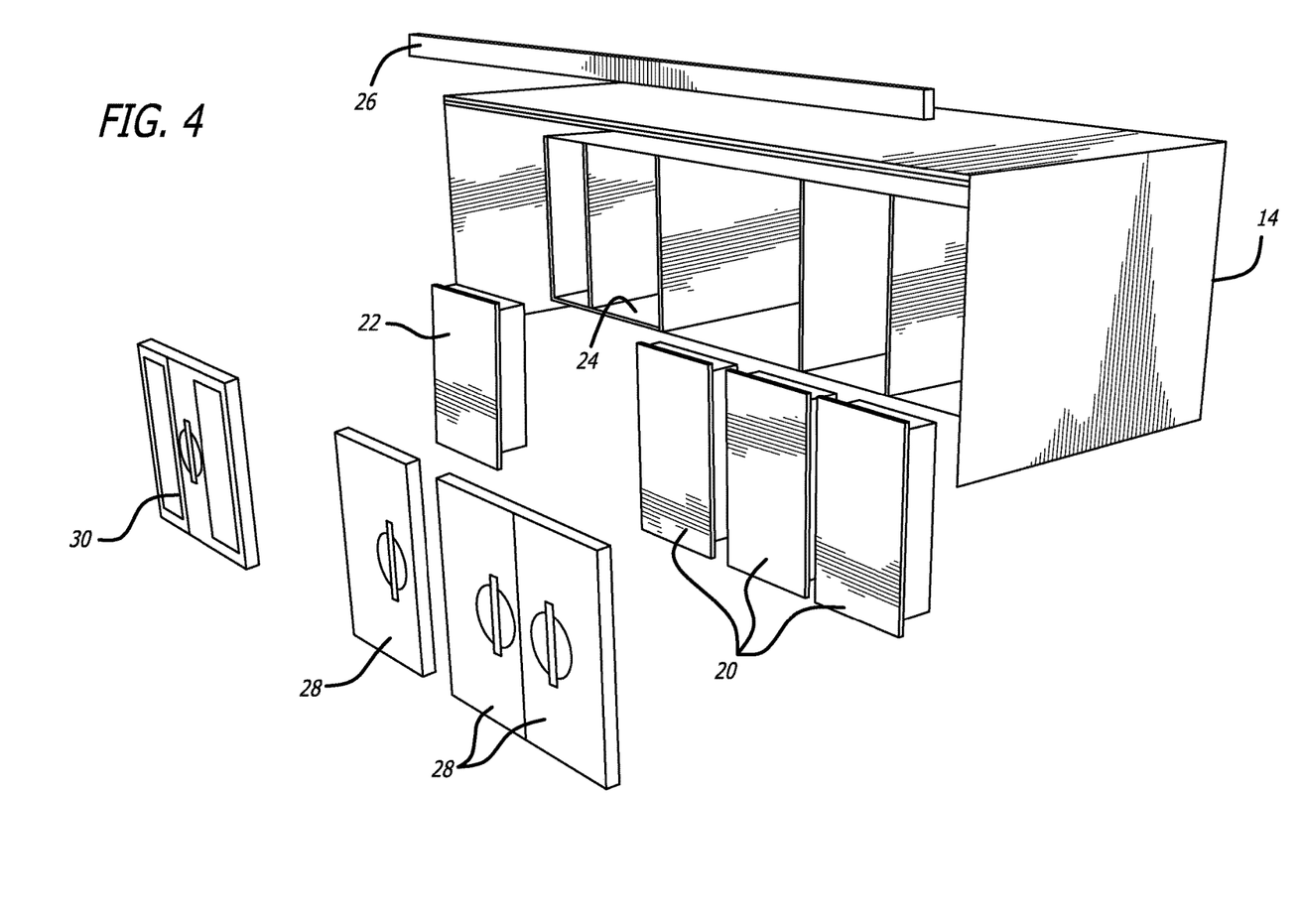
FIG. 4 is an exploded perspective view of the service module and oven/refrigerator modules.

FIG. 4 illustrates an exploded front view of the service module showing the oven modules 20 and refrigerator modules 22 at specially designed bays 24 optimized for this specific purpose. The oven modules 20 and the refrigerator module 22 work seamlessly with a human machine interface (HMI) 26 that is designed for each the oven and refrigerator components. The HMI, or smartbar, can be used to control the operation of all of the various galley inserts, lighting, etc. in the galley 10 with touch screen controls and/or displays for easy operation of the equipment. The smartbar 26 is preferably located on the upper front edge of the service module 14 so as to be in easy reach and operation by flight attendants. The smartbar 26 is connected to the various powered components by a bus (not shown) so that each component can be individually controlled by the flight attendant via the smart bar 26. By integrating all of the elements into the service module 14, the control of the ovens and refrigerators, as well as lighting, brewing equipment, and other electrical apparatus are controlled conveniently from a single location. Each oven module 22 is enclosed by oven doors 28, while the refrigerator module 22 is covered by the refrigerator doors 30.

Figure 5:
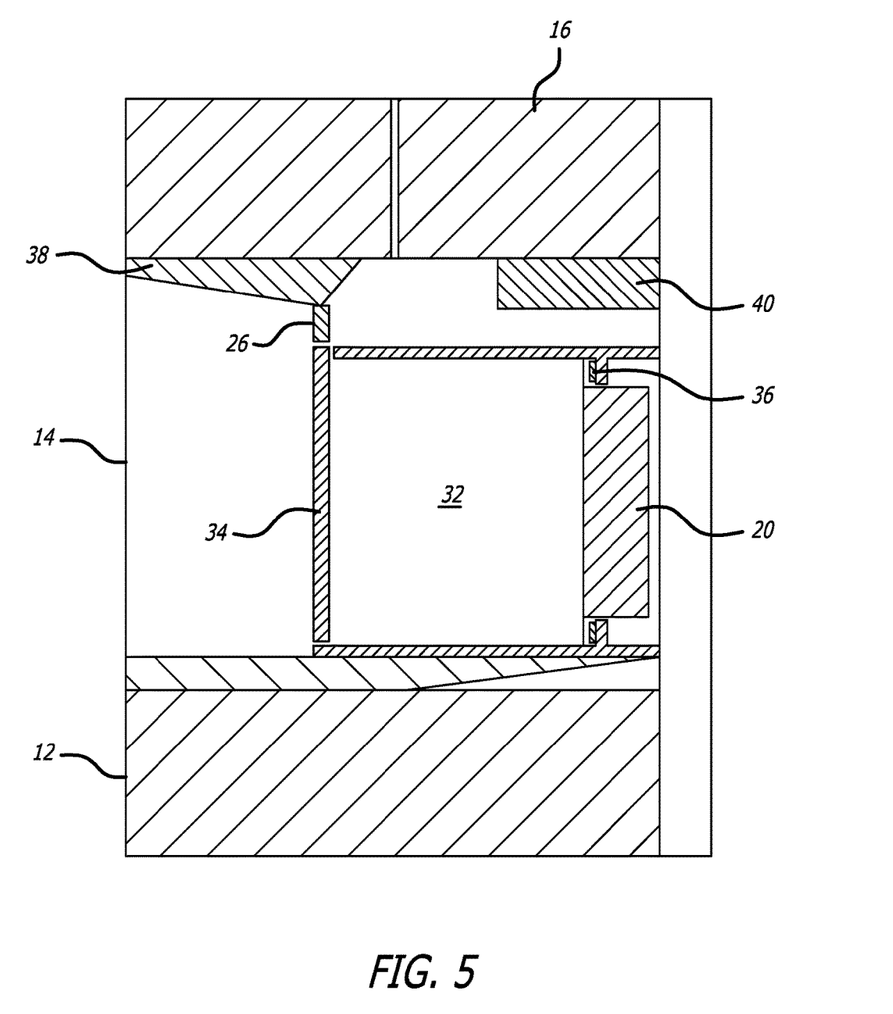
FIG. 5 is a cross sectional view of the service module at an oven bay.

The service module 14 is formed with pre-molded oven and refrigerator bays 24 that are specifically designed and sized for each oven or refrigerator unit to be used on the aircraft, and also include in the design the necessary channels, conduits, cabling, and the like for electronics, venting, cooling, etc. Each bay 24 is formed to minimize wasted space, using common walls to create the necessary enclosures while eliminating excess weight. FIG. 5 illustrates a cross-sectional view of the service module 14, including an oven module 20 in the oven bay 32. The oven bay 32 is defined by thermally insulated enclosure walls 34, and the oven module 20 includes a thermal seal 36 at the rear of the wall to prevent heat from escaping through the back of the service module. The smartbar 26 is seated on top of the bay 32, and there are venting channels 38 formed in the service module for carrying away heat generated by the oven. An integrated power and control unit 40 is located at the back of the service module bay to control the power distribution of the galley, as set forth below.

It can be seen that there is very little wasted space due to the specially designed bay that is designed to the particular appliance needs. The HMI 26 works with a controller 40 and the oven module 20 to serve as the control center for the oven. The oven module 20 receives commands from the HMI 26 and the control unit 40 to perform the necessary functions to operate the oven (or other insert).

The Galley Power and Control Unit (GPAC) 42 controls the galley's power system and provides the necessary power sharing to operate the entire galley 10. Because power is limited on an aircraft, the GPAC 42 is necessary to make sure the power is allocated to each power client in the priority that is supposed to occur. The Insert Power and Control ("IPAC") unit 40 controls the function of the components such as heating and cooling elements, coffee makers, trash compactors, and the like. Each insert can include a separate IPAC 40, or the galley 10 may have a single IPAC 40 that controls all of the inserts. Similarly, the HMI 26 provides access control to the flight attendant and may be either a shared (smartbar) or individual component. A sample block diagram of the galley power and control system is provided in FIG. 6.

Figure 6:
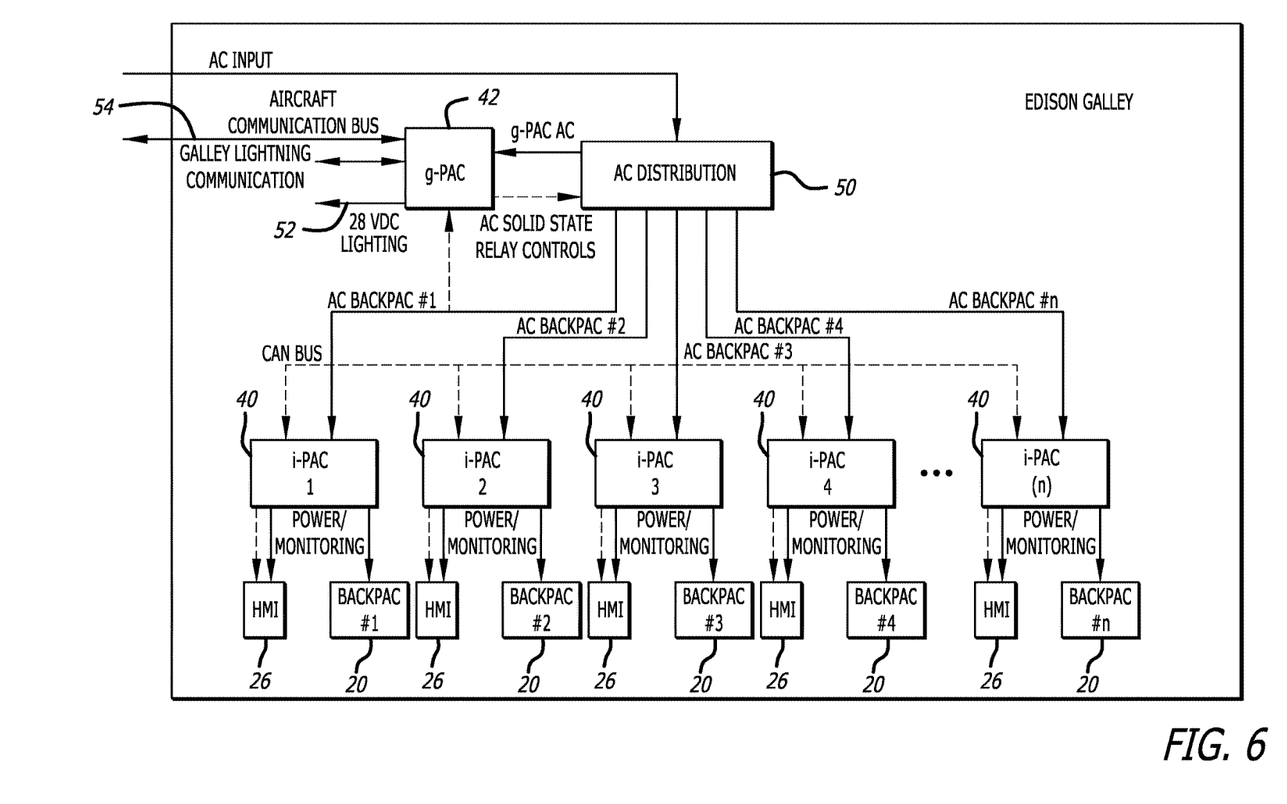
FIG. 6 is a block diagram of a power distribution center for the galley.

From the block diagram of FIG. 6, it can be seen that each galley bay receives power from the AC Distribution 50 and control from the GPAC 42. Also, each bay 24 includes an HMI 26 and GAIN module 20,22, which can be an oven, refrigerator, or the like. The number of IPACs can be tailored to the needs of the particular galley and aircraft, and thus there is no limitation on the number of IPACS 40 for each galley. The GPAC 42 can also control the lighting 52, the galley communications bus 54, as well as other functions of the galley, and receives its power from the AC distribution unit.

From the diagram, the GPAC 42 controls the galley system, and the IPAC 40 controls the function of the components such as the heating and cooling elements. The IPAC may be a common part of all GAIN types. The human machine interface 26 provides access control to the user and may also be a common part. When arranged in the foregoing way, the present invention provides a light weight, space efficient galley by reducing redundant walls, structure, and air gaps typically found in convention galley architecture. Command and control are simplified and modularity provides for better configurability, where all of the individual components of the galley service module are arranged so as to operate as one system. Space is conserved because no wasted space is needed to accommodate the GAINs, as each bay is specifically designed for each designated GAIN.

It will be apparent from the foregoing that while particular forms of the invention have been illustrated and described, various modifications can be made without departing from the spirit and scope of the present invention. Accordingly, it is not intended that the invention be limited but rather all modifications and substitutions that would be recognized by one of ordinary skill in the art are intended to be included in the scope of the invention.

We claim:

1. An integrated aircraft galley structure comprising:
   a bottom portion including a storage area for serving carts;
   an upper portion including a second storage area; and
   a service module between the upper portion and the bottom portion, the service module comprising
      a plurality of galley inserts each requiring power distribution,
      a plurality of bays formed in the service module and sized to receive the plurality of galley inserts,
      a human machine interface for controlling the plurality of galley inserts, the human machine interface being in a form of a bar extending along the plurality of galley inserts,
      at least one insert power and control unit for controlling at least one function of each galley insert of the plurality of galley inserts, and
      a galley power and control unit for allocating power to the plurality of insert galley power and control units.

2. The integrated aircraft galley structure of claim 1, wherein the plurality of galley inserts include at least one oven.

3. The integrated aircraft galley structure of claim 2, wherein each bay having an oven includes venting formed in the bay.

4. The integrated aircraft galley structure of claim 2, wherein each bay having an oven includes thermally insulated walls.

5. The integrated aircraft galley structure of claim 2, wherein each bay having an oven includes a thermal seal at the galley insert of the respective bay.

6. The integrated aircraft galley structure of claim 1, further comprising a cooling panel behind the service module including a shield for limiting heat dissemination beyond the cooling panel.

7. The integrated aircraft galley structure of claim 1, wherein each galley insert is permanently fixed in an associated bay of the plurality of bays.

8. The integrated aircraft galley structure of claim 1, wherein the plurality of galley inserts include at least one refrigeration unit.

9. The integrated aircraft galley structure of claim 8, further comprising a heat exchanger in the galley insert associated with the refrigeration unit.

10. The integrated aircraft galley structure of claim 1, wherein the human machine interface further comprises at least one lighting control.

11. The integrated aircraft galley structure of claim 1, wherein the human machine interface comprises a touch screen control interface.

12. The integrated aircraft galley structure of claim 1, wherein the human machine interface extends along an upper front edge of the service module.

13. The integrated aircraft galley structure of claim 1, further comprising an AC distribution unit for distributing power to the plurality of insert power and control units.

14. The integrated aircraft galley structure of claim 1, wherein the galley power and control unit allocates power to each galley insert of the plurality of galley inserts in designated priority.

15. The integrated aircraft galley structure of claim 1, wherein the at least one insert power and control unit comprises a plurality of insert power and control units each configured to control at least one respective function of a respective galley insert of the plurality of galley inserts.

* * * * *